(12) United States Patent
Brown et al.

(10) Patent No.: US 7,966,592 B2
(45) Date of Patent: Jun. 21, 2011

(54) DUAL PATH STATIC TIMING ANALYSIS

(75) Inventors: Jeffrey S. Brown, Fort Collins, CO (US); Jonathan W. Byrn, Fort Collins, CO (US); Mark F. Turner, Longmont, CO (US)

(73) Assignee: LSI Corporation, Milpitas, CA (US)

( * ) Notice: Subject to any disclaimer, the term of this patent is extended or adjusted under 35 U.S.C. 154(b) by 471 days.

(21) Appl. No.: 12/206,048

(22) Filed: Sep. 8, 2008

(65) Prior Publication Data

US 2009/0144682 A1  Jun. 4, 2009

Related U.S. Application Data

(60) Provisional application No. 60/990,980, filed on Nov. 29, 2007.

(51) Int. Cl.
*G06F 17/50* (2006.01)
*G06F 9/455* (2006.01)

(52) U.S. Cl. ...................................... 716/108

(58) Field of Classification Search .................. 716/106, 716/108, 134, 137–138
See application file for complete search history.

(56) References Cited

U.S. PATENT DOCUMENTS

| | | | | |
|---|---|---|---|---|
| 6,237,127 B1* | 5/2001 | Craven et al. | ................. | 716/108 |
| 6,305,001 B1* | 10/2001 | Graef | ........................... | 716/105 |
| 6,385,759 B1* | 5/2002 | Batarekh | ...................... | 716/108 |
| 6,564,360 B2* | 5/2003 | Chiu | ............................. | 716/108 |
| 6,708,139 B2* | 3/2004 | Rearick et al. | ............... | 702/185 |
| 6,710,637 B1* | 3/2004 | Chan | ............................ | 327/259 |
| 6,886,147 B2* | 4/2005 | Johnson et al. | .............. | 716/114 |
| 7,047,175 B1* | 5/2006 | Jain et al. | ........................ | 703/19 |
| 7,134,062 B2* | 11/2006 | Yan | ................................ | 714/731 |
| 7,278,126 B2* | 10/2007 | Sun et al. | ....................... | 716/114 |
| 7,506,293 B2* | 3/2009 | Dasdan et al. | ................ | 716/113 |
| 2002/0178427 A1* | 11/2002 | Ding et al. | ..................... | 716/12 |
| 2005/0229127 A1* | 10/2005 | Warren | ............................ | 716/6 |
| 2007/0033551 A1* | 2/2007 | Greaves et al. | ................. | 716/3 |
| 2007/0226668 A1* | 9/2007 | Dasdan et al. | ................... | 716/6 |

* cited by examiner

*Primary Examiner* — Stacy A Whitmore
(74) *Attorney, Agent, or Firm* — Christopher P. Maiorana, PC

(57) ABSTRACT

A method to analyze timing in a circuit, generally including (A) simulating reception of an input signal and a clock signal at a first flip-flop, wherein (i) the input signal has a latest transition, (ii) the input signal arrives through a first path and (iii) the clock signal has an active edge, (B) calculating a value of a time difference between the latest transition and the active edge, (C) calculating a delay between the active edge and the latest transition appearing in an output signal, wherein (i) the delay is based on a model responding to the value, (ii) the model characterizes a clock-to-output delay as a function of the time difference and (iii) the characterization covering a range of values, (D) calculating an arrival time of the latest transition at a second flip-flop through a second signal path and (E) storing the arrival time in a recording medium.

20 Claims, 8 Drawing Sheets

US 7,966,592 B2

DUAL PATH STATIC TIMING ANALYSIS

CROSS REFERENCE TO RELATED APPLICATIONS

This application claims the benefit of U.S. Provisional Application Ser. No. 60/990,980, filed Nov. 29, 2007, which is hereby incorporated by reference in its entirety.

FIELD OF THE INVENTION

The present invention relates to static timing analysis generally and, more particularly, to a method and/or apparatus for implementing a dual path static timing analysis.

BACKGROUND OF THE INVENTION

Referring to FIG. 1, a graph 20 of example waveforms of a conventional flip-flop is shown. The flip-flop may receive an input signal (i.e., D), receive a clock signal (i.e., CLK) and generate an output signal (e.g., Q). The flip-flop has a characteristic setup time (i.e., Tsu), a hold time (i.e., Th) and a clock-to-Q delay (i.e., Tco) relative to an active edge (i.e., AE) of the signal CLK. If the input signal is held steady through the setup time and the hold time, the output signal will represent the captured input signal after the clock-to-Q delay.

The clock-to-Q delay of the flip-flop is dependent on a signal setup (or arrival) time relative to the active edge. For larger signal setup times, the clock-to-Q delay is faster than for smaller signal setup times. Typical flip-flop characterization for setup times is done based on how far the clock-to-Q delay of the flip-flop pushes out at a particular signal setup time. Typically a fixed signal setup time is characterized as that time that produces a 10% increase in the clock-to-Q timing of the flip-flop compared with the clock-to-Q timing of an infinite signal setup time. The recorded clock-to-Q timing used for a Static Timing Analysis (STA) is the delay that corresponds to a "more than adequate" setup time. As such, a true delay through a flip-flop of a minimally setup signal will be 10% greater than the delay value commonly given to STA tools.

A global timing margin is commonly added across the circuit design in an attempt to compensate for issues, such as the 10% longer than expected clock-to-Q delay. In order to meet ever more challenging power and performance issues, the global margins are being deconstructed and eliminated. Further, the deconstruction yields issues, in terms of additional methods, that are added to compensate in specific terms rather than global terms. For example, tools are routinely used today that trade circuit speed for power. The circuits are slowed down by using slower but more power-efficient devices until the circuit just meets the timing criteria in order to save power. Such design activity is common for power reduction. However, side effects of slowing the circuit are increasing the number of ill-modeled paths and inducing a significant increase in undetected timing errors. A further problem with errors of such a nature is that the errors are difficult to debug when the design fails in the edge of a device-yield distribution.

SUMMARY OF THE INVENTION

The present invention concerns a method to analyze timing in a circuit. The method generally includes the steps of (A) simulating a reception of both an input signal and a clock signal at a first flip-flop, wherein (i) the input signal has a latest transition, (ii) the input signal arrives through a first path of the circuit and (iii) the clock signal has an active edge, (B) calculating a first value of a time difference between the latest transition and the active edge, (C) calculating a first delay between the active edge and the latest transition appearing in an output signal of the first flip-flop, wherein (i) the first delay is based on a model responding to the first value, (ii) the model characterizes a clock-to-output delay of the first flip-flop as a function of the time difference and (iii) the characterization covering a range of values, (D) calculating a first arrival time of the latest transition in the output signal at a second flip-flop, wherein the second flip-flop is connected to the first flip-flop through a second signal path and (E) storing the first arrival time in a recording medium.

The objects, features and advantages of the present invention include providing a method and/or apparatus for implementing a dual path static timing analysis that may (i) reduce global timing margins, (ii) replace single point flip-flop models with models that are context accurate, (iii) provide more optimal size, power and/or performance solutions for circuit designs and/or (iv) provide more degrees of design freedom by allowing timing to be altered in the current path.

BRIEF DESCRIPTION OF THE DRAWINGS

These and other objects, features and advantages of the present invention will be apparent from the following detailed description and the appended claims and drawings in which:

DETAILED DESCRIPTION OF THE PREFERRED EMBODIMENTS

Some embodiments of the present invention generally provide a static timing analysis engine (or tool) that is aware of timings in a prior path such that a flip-flop clock-to-Q timing in a current path under analysis may be accurately calculated. The tool may work in conjunction with added data in a liberty model of the flip-flops to calculate the clock-to-Q delays for various setup times and/or hold times.

Figure 1:
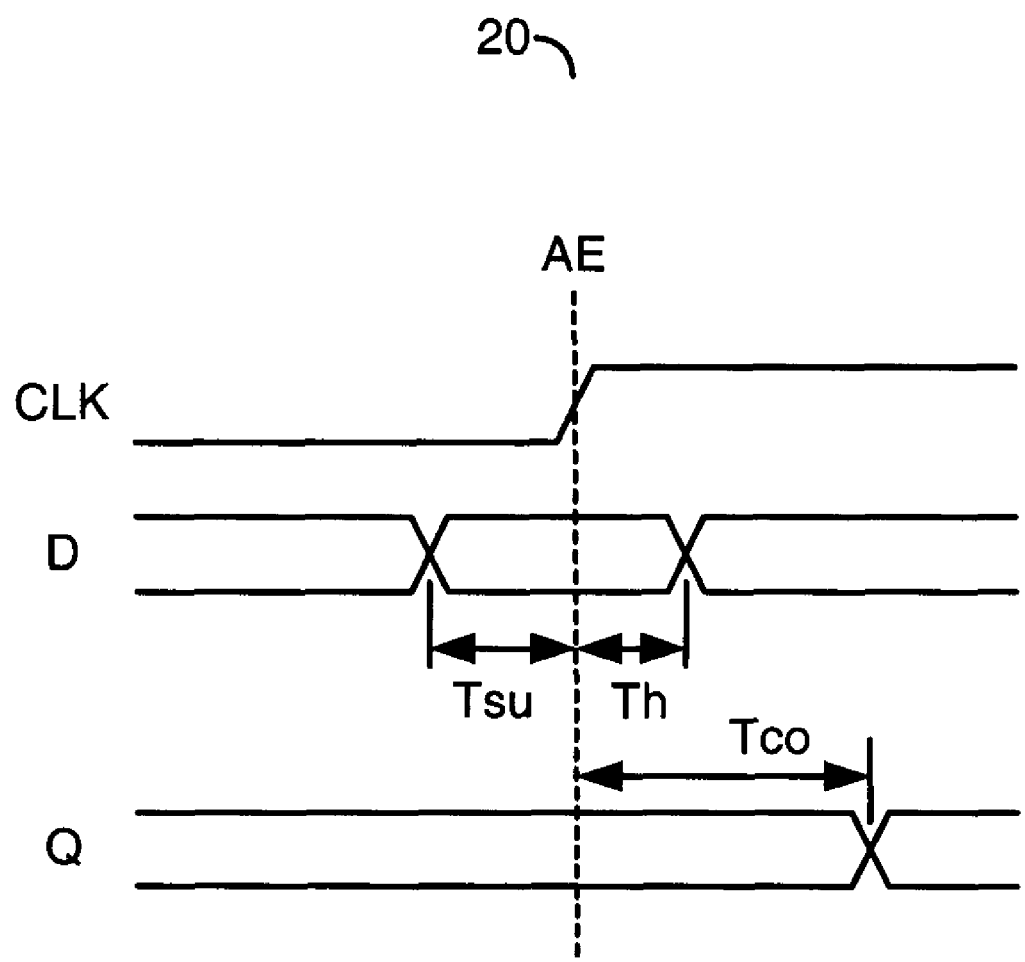
FIG. 1 is a graph of example waveforms of a conventional flip-flop.
Figure 2:
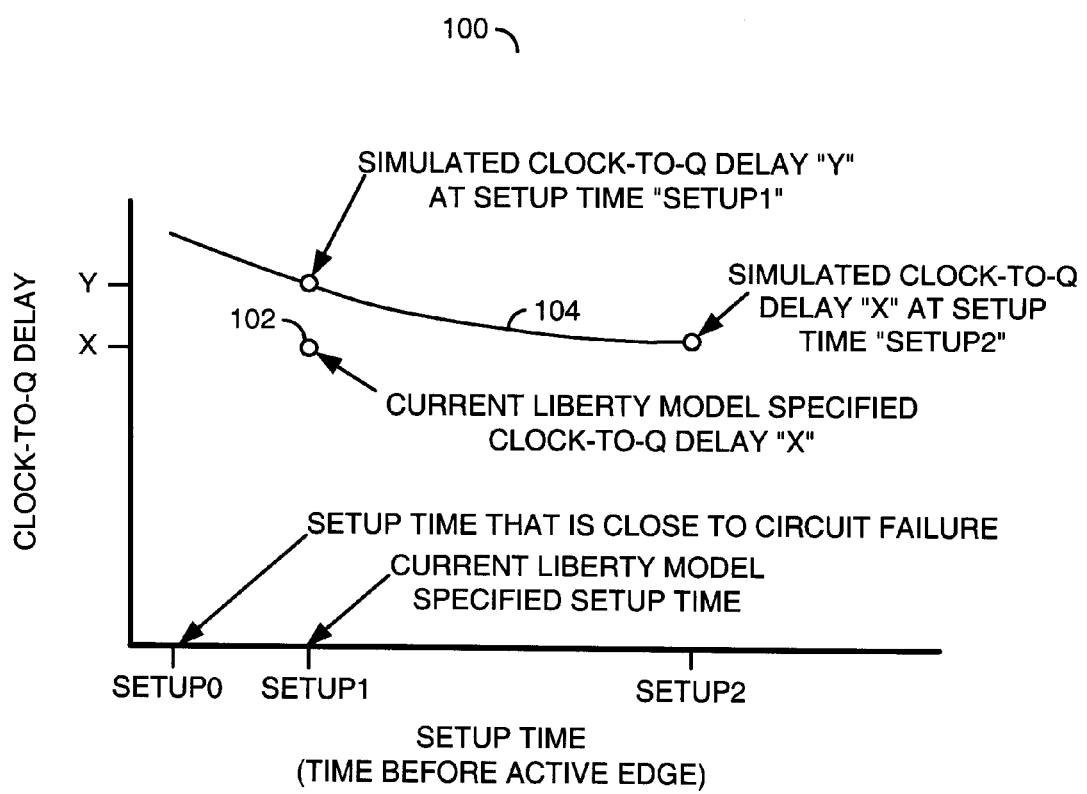
FIG. 2 is a graph of an example clock-to-Q delay as a function of signal setup time.

Referring to FIG. 2, a graph 100 of an example clock-to-Q delay as a function of signal setup time is shown. A flip-flop characterization is generally done for signal setup times that yield a certain percent push-out in the clock-to-Q delay compared with situations where the signal setup time is large. At a large signal setup time (e.g., SETUP2), a minimal clock-to-Q delay (e.g., time X) may be found. As the signal setup time is reduced (e.g., reduced from SETUP2 to SETUP1), the corresponding clock-to-Q delay generally increases to a longer time (e.g., increase from the time X to the time Y). An existing flip-flop characterization may produce liberty model data with the setup time specified as SETUP1 and the clock-to-Q delay specified as the time X (e.g., point 102). A device setup time specified by the manufacturer of the flip-flop is generally located between SETUP1 and SETUP2, inclusively.

To create a more accurate characterization of the clock-to-Q delays, a range of time differences corresponding to signal setup times between a short time (e.g., SETUP0) and the time SETUP2 may be depicted by a curve 104. The curve 104 may be recorded into a lookup table for subsequent use by the STA engine. Typically the pass/fail stop point for the signal setup time of a flip-flop may be a "hard fail" in the STA. The "hard fail" may be denoted as the time SETUP1, where a derivation of SETUP1 (i) may be based upon the clock-to-Q delay push-out and (ii) does not denote a signal setup time specification that causes a circuit failure. An advantage of utilizing the curve 104 instead of the point 102 is that circuit functionality may be modeled in an extended operating range by fully characterizing clock-to-Q delays for signal setup times that produce a greater than a given (e.g., 10%) push-out in the clock-to-Q delay.

The large characterization range may be exploited in cases that currently depend on added useful skew to meet timing criteria. Therefore, implementing additional elements and/or power consumption in the clock tree in order to skew the timings may be avoided. If the circuit already functions by missing SETUP2 but meets SETUP1, the existing single-point characterization of the flip-flop may be sufficient in the STA. In comparison, if the circuit meets SETUP0 but not SETUP1, as things stand today, delay elements and/or additional power consumption would be inserted into the circuit design to move the clock edge out in time to obtain SETUP1. The existing STA techniques assume that the variation between SETUP0 and SETUP1 do not play a role a clock-to-Q variation in a subsequent path driven by the flip-flop that missed SETUP1.

Still referring to FIG. 2, the time difference SETUP0 generally denotes a signal setup time for the flip-flop that causes (or comes close to causing) an actual circuit failure. By modeling the clock-to-Q delay variation across a full spread of signal setup times (e.g., the curve 104), a circuit designer may accurately model a wide range of situations and thus may potentially ease timing closure. With the clock-to-Q delay modeled by a lookup table for setup time dependency, the STA engine may analyze two or more back-to-back logic paths in determining if a circuit failure has occurred or not.

Figure 3:
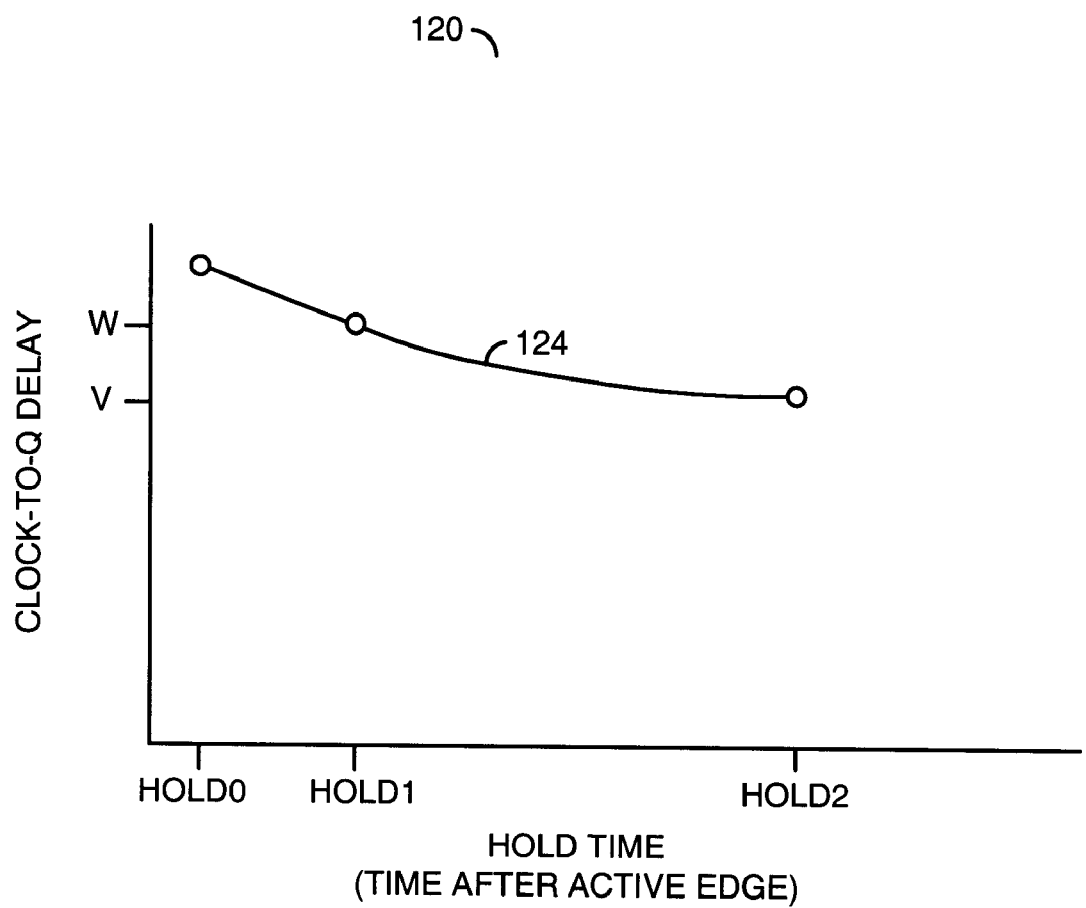
FIG. 3 is a graph of an example clock-to-Q delay as a function of signal hold time.

Referring to FIG. 3, a graph 120 of an example clock-to-Q delay as a function of signal hold time is shown. At a large signal hold time (e.g., HOLD2), a minimal clock-to-Q delay (e.g., value V) may be found. As the signal hold time is reduced (e.g., reduced from HOLD2 to HOLD1), the corresponding clock-to-Q delay generally increases to a longer time (e.g., increase from the time V to the time W). As with the signal setup times, the value of HOLD1 may be a given percentage (e.g., 10%) longer than the value of HOLD2. A short time difference (e.g., HOLD0) may characterize a shortest difference at which the flip-flop may barely capture or fails to capture the input signal. A characterization curve 124 that models the signal hold times may be stored in the lookup table with the data points of the signal setup time curve 104. A device hold time specified by the manufacturer of the flip-flop is generally located between HOLD1 and HOLD2, inclusively.

Figure 4:
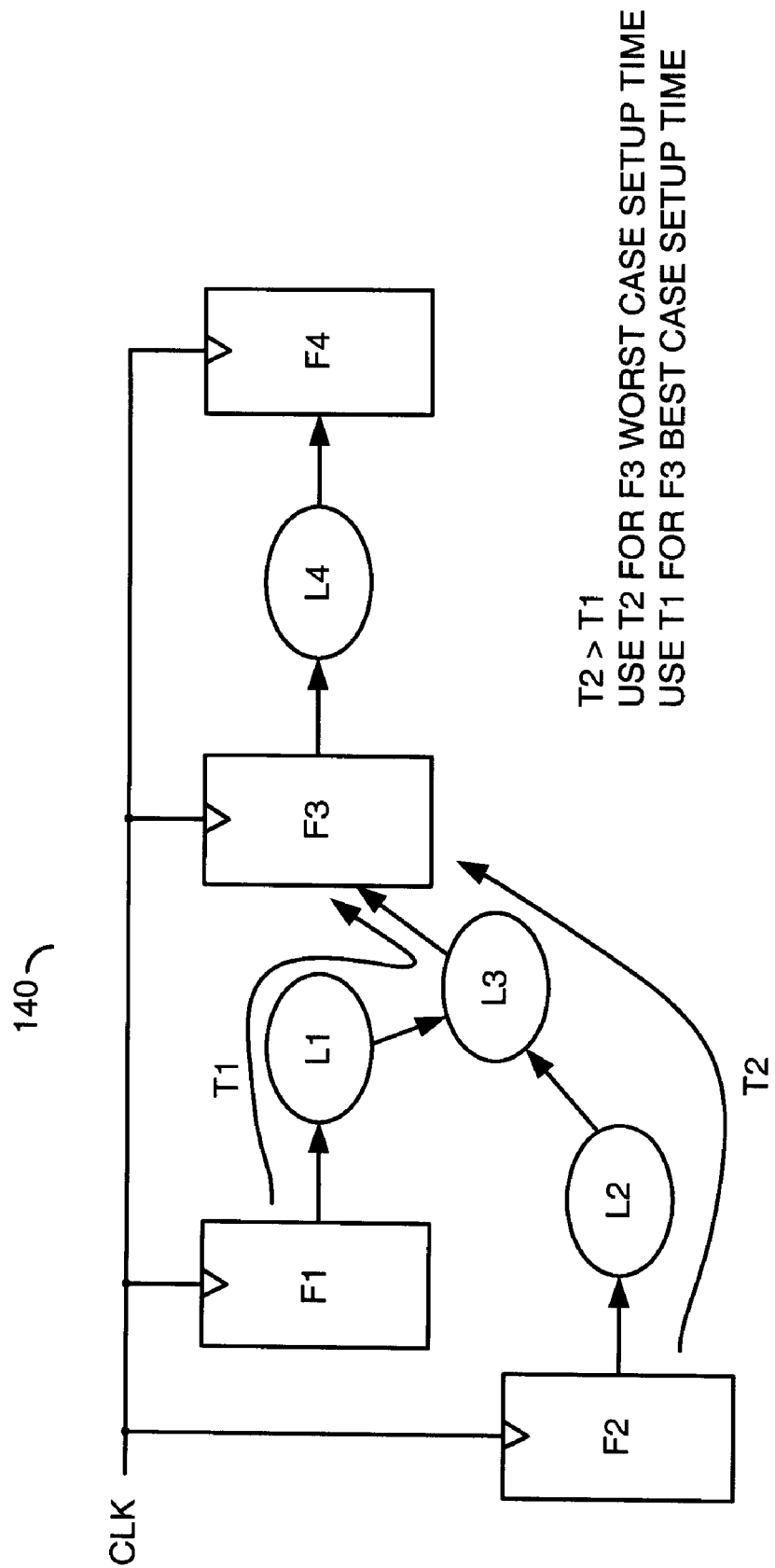
FIG. 4 is a block diagram of an example circuit.

Referring to FIG. 4, a block diagram of an example circuit 140 is shown. The circuit (or system) 140 generally comprises multiple flip-flops (or registers) F1-F4 disposed before and after multiple logic blocks (or modules) L1-L4. Each of the flip-flops F1-F4 may buffer one or more bits of data. In the example, all of the flip-flops F1-F4 may be clocked by a common signal (e.g., CLK).

Data stored in the flip-flop F1 may be presented to the logic block L1. Data generated by the logic block L1 may be transferred to the logic block L3. Likewise, data stored in the flip-flop F2 may be presented to the logic block L2. Data generated by the logic block L2 may be transferred to the logic block L3. The logic block L3 may operate on the data received from the logic blocks L1 and L2 to generate output data buffered in the flip-flop F3. The data in the flip-flop F3 may be presented to the logic block L4. Output data from the logic block L4 may be buffered by the flip-flop F4. Other circuit arrangements and clocking arrangements may be implemented to meet the criteria of a particular application.

A first data path may be established from the flip-flop F1 to the flip-flop F3 through the logic blocks L1 and L3. A signal delay from the flip-flop F1 to the flip-flop F3 may be designated as T1. A second data path may be established from the flip-flop F2 to the flip-flop F3 through the logic blocks L2 and L3. A signal delay from the flip-flop F2 to the flip-flop F3 may be designated as T2. By way of example, the signal delay T2 may be considered longer than the signal delay T1.

Consider an STA analysis for a third path from the flip-flop F3 through the logic block L4 to the flip-flop F4. When analyzing the third path for a maximum delay/setup analysis, the clock-to-Q delay of the flip-flop F3 may be dependent on a worst case arrival (signal setup) time that the flip-flop F3 sees in one or more of the previous paths. From FIG. 4, the flip-flop F3 is fed from both flip-flops F1 and F2. The delay T2 in the example generally depicts the slowest path to the flip-flop F3 and thus may be used to determine the worst case signal setup time that the flip-flop F3 sees in the previous path (e.g., from the logic block L3 into the flip-flop F3).

In a similar fashion, the delay T2 generally will depend on the signal setup time that the flip-flop F2 sees in a previous path. Therefore, the STA engine should traverse the circuit design in an order of data flow instead of analyzing paths in any order.

Still referring to FIG. 4, once the delay T2 has been determined by the STA engine, the worse case signal setup time for the flip-flop F3 may be calculated. From the characterization data (e.g., curve 104) in the lookup tables in the liberty model, the resulting clock-to-Q delay through the flip-flop F3 for a maximum/setup analysis may be determined. The calculated clock-to-Q delay may be used for the maximum delay analysis in the third path (F3->L4->F4) to determine if the circuit design meets a hard failure point for setup on the flip-flop F4.

For minimum/hold analysis on the same path, the best case setup path that feeds the flip-flop F3 may be examined. In the example case, the delay T1 generally depicts the quickest path for setup on the flip-flop F3. With T1 known, the best case setup time for F3 may be found, and the lookup tables in the liberty model may be used to calculate the resulting clock-to-Q delay of the flip-flop F3. With the best case clock-to-Q delay value, minimum/hold analysis may be done on path F3->L4->F4. The analysis may continue with paths fed by the flip-flop F4.

Figure 5:
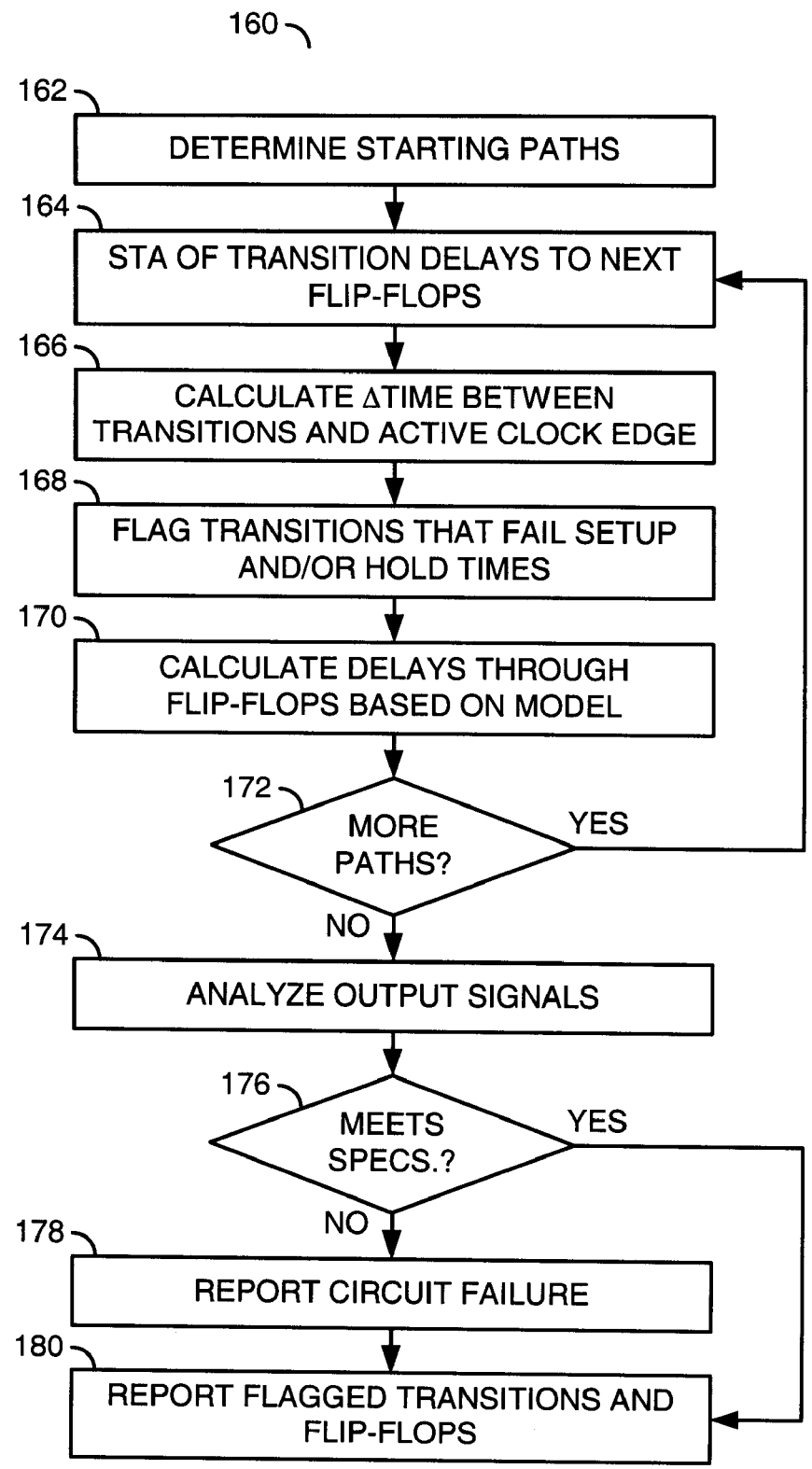
FIG. 5 is a flow diagram of an example method to analyze timing in a circuit in accordance with a preferred embodiment of the present invention.

Referring to FIG. 5, a flow diagram of an example method 160 to analyze timing in a circuit is shown in accordance with a preferred embodiment of the present invention. The method (or process) 160 generally comprises a step (or block) 162, a step (or block) 164, a step (or block) 166, a step (or block) 168, a step (or block) 170, a step (or block) 172, a step (or block) 174, a step (or block) 176, a step (or block) 178 and a step (or block) 180. The method 160 may be implemented as part or all of a Static Analysis Timing engine (or tool) written in a common programming language.

In the step 160, the STA engine may analyze a circuit design to determine one or more starting paths for the timing analysis. A static timing analysis of the paths up to a set of flip-flops may be conducted by the STA engine in the step 164. The STA engine may calculate the time differences between all transitions arriving at the initial flip-flops and an active edge of a flip-flop clock signal in the step 166. The latest (slowest) arriving signal transition may provide a basis for a signal setup time analysis. The earliest (fastest) arriving signal transition may provide a basis for a signal hold time analysis. In the step 168, the STA engine may flag any transitions and the associated flip-flops that fail to meet either the time SETUP1 or the time HOLD1. Despite raising the flags, the STA engine may not indicate a circuit failure in the step 168.

In the step 170, the STA engine may use the time differences between the arriving transitions and a corresponding active clock edge to calculate the propagation (e.g., clock-to-Q) delay through the current flip-flops. The calculated propagation delays may be based on the models stored in the lookup tables. The STA engine may apply the actual time differences to the lookup tables and the modeled delays may be received back from the lookup tables.

A check for more signal paths may be made in the step 172. If more signal paths are available to be analyzed (e.g., the YES branch of step 172), the method 160 may return to the step 164. The next signal path (or signal paths) may be analyzed between the flip-flops just considered and the next set of flip-flops.

Once the last signal path has been considered (e.g., the NO branch of step 172), the method 160 may analyze the timing of the output signals in the step 174. If the output signals do not meet the specified timing criteria (e.g., the NO branch of step 176), a failure report may be generated in the step 178. The failure report may indicate that the circuit design failed the static timing analysis along with the data associated with the failure.

If the output signals meet the specified timing (e.g., the YES branch of step 176) or once the failure report has been generated, the STA engine may create another report identifying all of the transitions and the associated flip-flops that were flagged during the analysis in the step 180. The flagged transitions may be helpful to the circuit designers to identify why the circuit failed and/or how much timing margin may still be available inside the circuit design.

Figure 6:
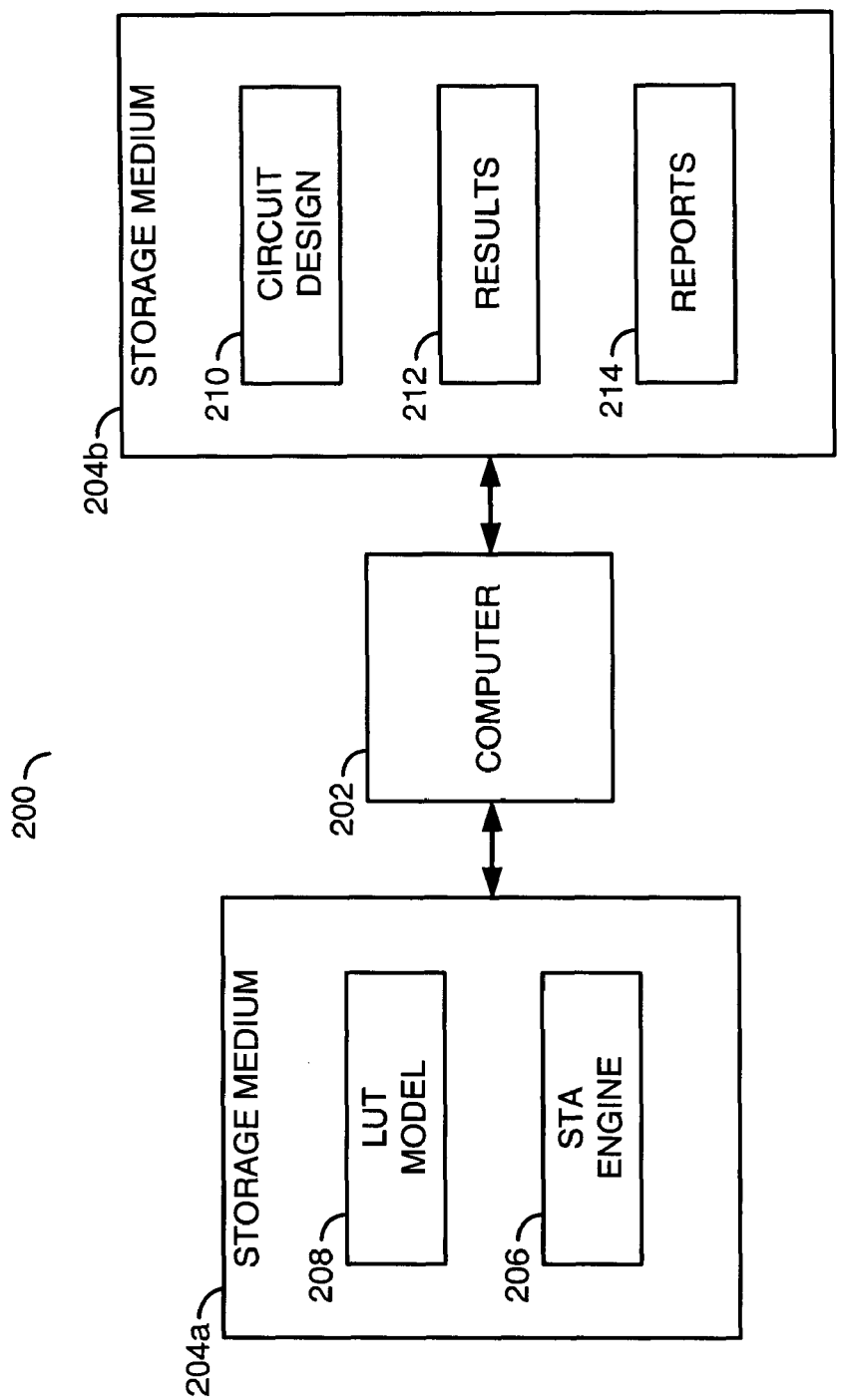
FIG. 6 is a block diagram of an example implementation of an apparatus used to analyze the circuit timing.

Referring to FIG. 6, a block diagram of an example implementation of an apparatus 200 used to analyze the circuit timing is shown. The apparatus (or system) 200 generally comprises a computer 202 and one or more storage media 204a-204b. The storage medium 204a may store a software program 206 and a lookup table (LUT) 208. The software program 206 (e.g., STA engine) may implement the steps of the method 160. The lookup table 208 may contain the models characterizing the flip-flops.

The storage (or recording) medium 204b may hold multiple files containing the design, analysis data and reports both utilized by and generated by the STA engine 206. The files generally include, but are not limited to, a circuit design file 210, a results file 212 and a report file 214. The circuit design file 210 may contain the circuit design subject to the static timing analysis. The file 212 may contain the digital data and flags generated during the analysis. The file 214 may hold the circuit failure reports and the flagged transition reports.

The software program 206 may be read and executed by the computer 202 to implement the process of analyzing the circuit timing (e.g., the method 160). The lookup table 208 and the files 210-214 may be created and accessed as appropriate during execution. In some embodiments, the software program 206, lookup table 208 and the files 210-214 may be stored in the same storage medium.

Figure 7:
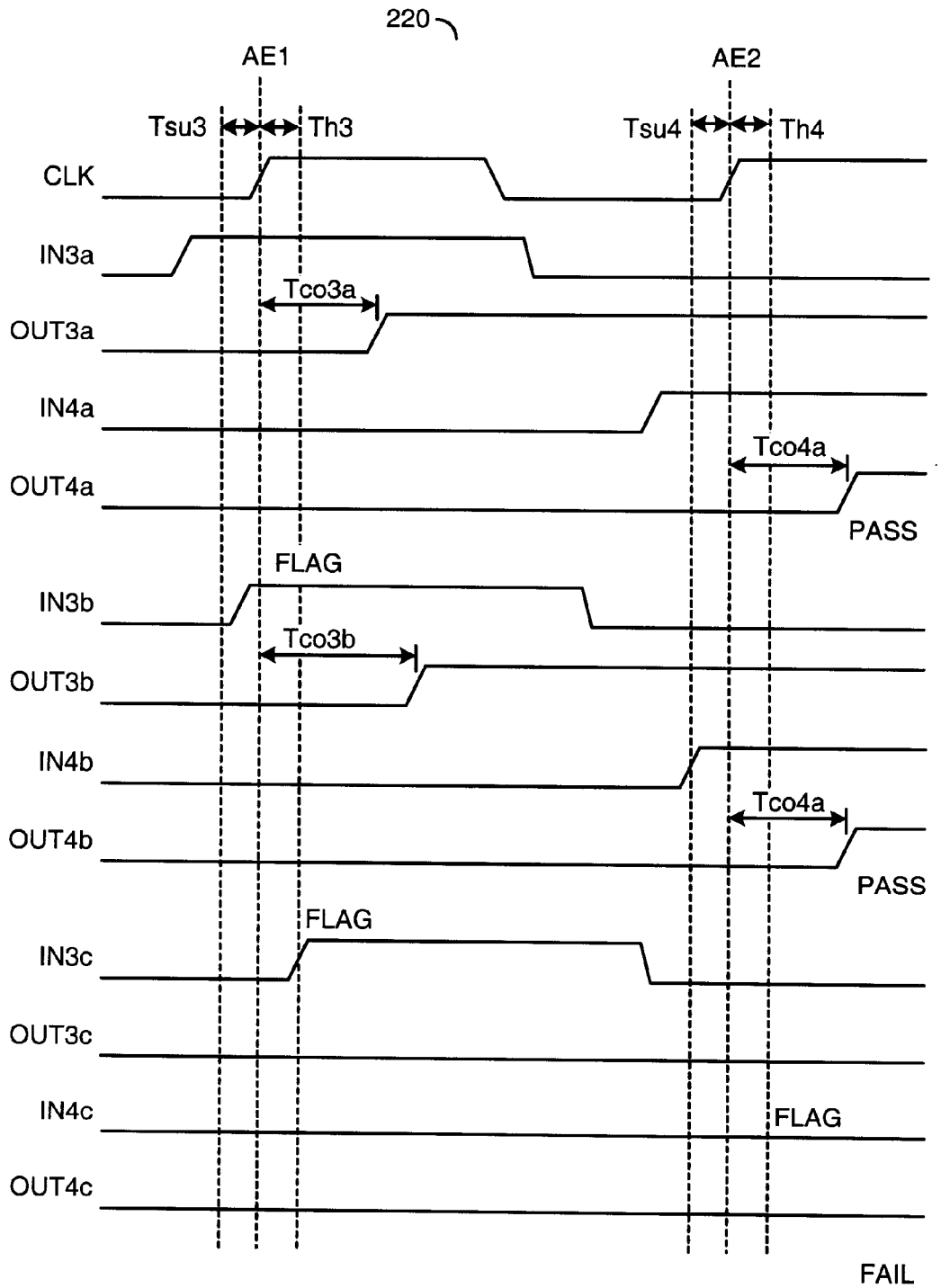
FIG. 7 is a graph of example waveforms illustrating a normal, first marginal and failed transitions.

Referring to FIG. 7, a graph 220 of example waveforms illustrating a normal, first marginal and failed transitions is shown. The waveforms may be illustrative of an operation of the circuit 140. The signal CLK generally comprises a sequence of active clock edges (e.g., AE1 and AE2). In the example, rising edge of the signal CLK are shown as the active edge. In some embodiments, the falling edges may be considered the active edges. In still other embodiments, both the rising edges and the falling edges of the signal CLK may be active edges.

An input signal (e.g., IN3a) into the flip-flop F3 may transition from a logical low state to a logical high state with a signal setup time and a signal hold time that exceed the device setup time (e.g., Tsu3) and the device hold time (e.g., Th3). As such, at the first active edge AE1, the flip-flop F3 properly captures the signal IN3a in the logical high state. After the normal clock-to-output (Q) delay (e.g., Tco3a), an output signal (e.g., OUT3a) generated by the flip-flop F3 may transition to the logical high state. Subsequently, the logical high state transition may be received by the flip-flop F4 as an input signal (e.g., IN4a) well before the next active edge AE2 of the signal CLK. The logical low to logical high transition of the signal IN4a may exceed the device setup time (e.g., Tsu4) and may be maintained through the device hold time (e.g., Th4). Thereafter, an output signal (e.g., OUT4a) of the flip-flop F4 may convey the logical low state to the logical high state transition a normal clock-to-output delay (e.g., Tco4a) after the active edge AE2.

If the logical low state to logical high state is slow in arriving at the flip-flop F3 (e.g., signal IN3b), the flip-flop F3 may take longer to create the transition in the output signal (e.g., OUT3b). As illustrated, if the transition occurs during the device setup time Tsu3, the clock-to-output delay (e.g., Toc3b) may be longer than the clock-to-output delay Toc3a. Consequently, the logical low state to logical high state transition in the output signal (e.g., OUT3b) may occur after the longer delay (e.g., Tco3b) after the active edge AE1, compared with the delay Tco3a. The STA engine may flag the late arrival of the transition in the signal IN3b as a potential issue to be considered at the end of the analysis. In the example, the longer delay Tco3b may still allow sufficient time for the transition to arrive at the flip-flop F4 (e.g., IN4b) before the beginning of the device setup time Tsu4. Therefore, the flip-flop F4 may present the transition in the output signal (e.g., OUT4b) after the normal delay Tco4a after the active edge AE2. As such, the STA engine may not indicate a circuit failure since the transition in the signals IN4b and OUT4b are generally within the specified limits.

If the logical low state to logical high state is late in arriving at the flip-flop F3 (e.g., signal IN3c), the flip-flop F3 may fail to capture the transition at the active edge AE1. Therefore, the output signal (e.g., OUT3c) may remain at the logical low state after the active edge AE1. The STA engine may flag the lateness of the transition arriving at the flip-flop F3 relative to the active edge AE1. Subsequently, the flip-flop F4 will miss the transition at the active edge AE2 and thus the STA engine may also flag the second miss for later consideration. In the example, the pulse in the signal IN3c is completely missed by the flip-flop F3 and thus is lost from the circuit 140. As such, the STA engine may indicate a circuit failure in the failure report and identify the flagged late arrival of the signal IN3c to the circuit designers as a possible reason.

Figure 8:
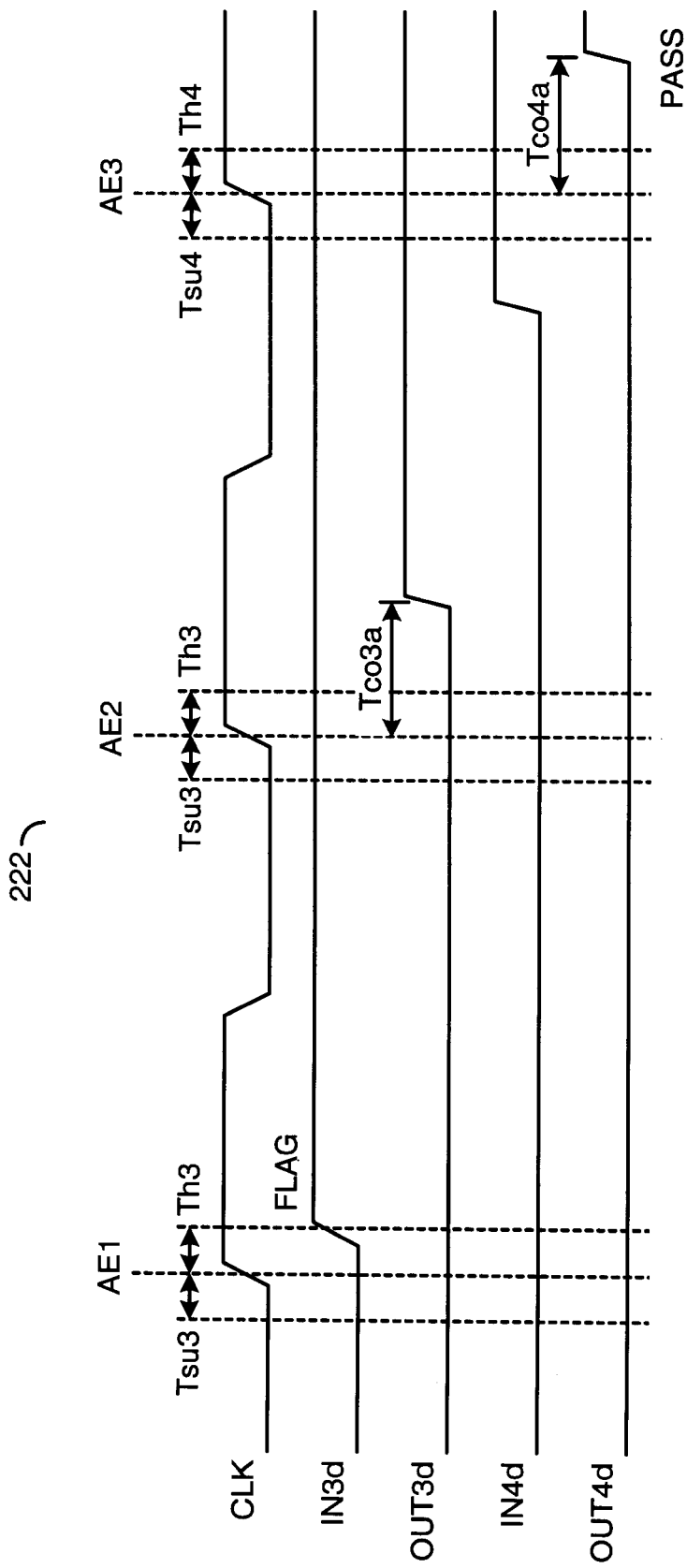
FIG. 8 is a graph of example waveforms illustrating a second marginal transition.

Referring to FIG. 8, a graph 222 of example waveforms illustrating a second marginal transition is shown. The waveforms may be illustrative of an operation of the circuit 140. The signal CLK may include another active edge (e.g., AE3) after the active edge AE2.

If the logical low to logical high transition in the input signal (e.g., IN3d) is late, the flip-flop F3 may fail to capture the signal IN3d in the logical high state. Thus, the STA engine may flag the missed capture for later analysis. In the example, the signal IN3d may remain in the logical high state until at least after the next active edge AE2 of the signal CLK. Therefore, the flip-flop F3 may capture the logical high state of the signal IN3d at the next active edge AE2 and present logical high state in the output signal (e.g., OUT3d). After passing through the logic block L4, the logic high state from the signal OUT3d may appear in an input signal (e.g., IN4d) at the flip-flop F4. As illustrate, the signal IN4d may acquire the logical high state before the device setup time Tsu4 and maintain the logical high state through the device hold time Th4. Therefore, the flip-flop F4 may pass the logical low state to logical high state transition in the output signal (e.g., OUT4d) after the normal clock-to-output delay Tco4a, but the event would be one clock cycle late due to the missed transition at the active edge AE1. The STA engine may report the missed capture at the active edge AE1 for the circuit designers to consider.

Properly modeling the clock-to-Q (output) setup and/or hold dependent delays of the flip-flops generally allows the STA engine to accurately model the circuit design thereby permitting accurate timing analysis. Subsequently, getting more accuracy in the STA may allow a portion of global margins applied at the chip level to be eliminated.

Extending the characterization of the setup/hold times may allow for detailed flip-flop models. Properly modeling the clock-to-Q push-out delay may also alleviate timing problems and thus reduce clock tree power. Power may be reduced by eliminating buffers inserted to delay the clock signal by a useful skew in cases where the useful skew is inappropriate. The miss on the conventional setup time would not have caused a functional circuit failure, but merely pushed the clock-to-Q delay out a bit further.

Some embodiments of the present invention may provide one or more advantages compared with common STA techniques. At the ASIC modeling level, more optimal size, power and/or performance solutions may be designed due to the higher degree of accuracy in modeling the flip-flops. Since path timing is dependent on all feeding paths and the setup time linkage to the flip-flop clock-to-Q delay is modeled in detail, power and timing optimizations may have more degrees of freedom. For example, timing may be altered in the current path by doing cell swaps in a number of subsequent paths. The addition design freedom may make optimization more complicated, but should lead to more optimal solutions.

The functions performed by the diagrams of FIGS. 1-8 may be implemented using a conventional general purpose digital computer programmed according to the teachings of the present specification, as will be apparent to those skilled in the relevant art(s). Appropriate software coding can readily be prepared by skilled programmers based on the teachings of the present disclosure, as will also be apparent to those skilled in the relevant art(s).

The present invention may also be implemented by the preparation of ASICs, FPGAs, or by interconnecting an appropriate network of conventional component circuits, as is described herein, modifications of which will be readily apparent to those skilled in the art(s).

The present invention thus may also include a computer product which may be a storage medium including instructions which can be used to program a computer to perform a process in accordance with the present invention. The storage medium can include, but is not limited to, any type of disk including floppy disk, optical disk, CD-ROM, magneto-optical disks, ROMs, RAMs, EPROMS, EEPROMs, Flash memory, magnetic or optical cards, or any type of media suitable for storing electronic instructions.

While the invention has been particularly shown and described with reference to the preferred embodiments thereof, it will be understood by those skilled in the art that various changes in form and details may be made without departing from the scope of the invention.

The invention claimed is:

1. A method to analyze timing in a circuit, comprising the steps of:
   (A) simulating a reception of both an input signal and a clock signal at a first flip-flop, wherein (i) said input signal has a latest transition, (ii) said input signal arrives through a first path of said circuit and (iii) said clock signal has an active edge;
   (B) calculating, using a processor, a first value of a time difference between said latest transition and said active edge;
   (C) calculating a first delay between said active edge and said latest transition appearing in an output signal of said first flip-flop, wherein (i) said first delay is based on a model responding to said first value, (ii) said model characterizes a clock-to-output delay of said first flip-flop as a function of said time difference and (iii) said characterization covering a range of values;
   (D) calculating a first arrival time of said latest transition in said output signal at a second flip-flop, wherein said second flip-flop is connected to said first flip-flop through a second signal path; and
   (E) storing said first arrival time in a recording medium.

2. The method according to claim 1, wherein said range covers (i) from approximately a short value at which said first flip-flop cannot capture said latest transition (ii) to a long value at which said clock-to-output delay is approximately a minimum delay through said first flip-flop.

3. The method according to claim 1, further comprising the step of:
   conducting a static timing analysis of said circuit, wherein said static timing analysis does not indicate a circuit failure where (i) said first value of said time difference fails a first setup time of said first flip-flop and (ii) said first arrival time of said latest transition in said output signal meets a second setup time of said second flip-flop.

4. The method according to claim 3, wherein said first setup time comprises a particular value of said time difference at which said clock-to-output delay is approximately a given percentage longer than a minimum clock-to-output delay of said first flip-flop.

5. The method according to claim 1, further comprising the step of:
   conducting a static timing analysis of said circuit, wherein said static timing analysis does not indicate a circuit failure where (i) said first value of said latest transition is too short to be captured by said first flip-flop and (ii) said first arrival time of said latest transition in said output signal meets a specified arrival time at said second flip-flop.

6. The method according to claim 1, further comprising the step of:

conducting a static timing analysis of said circuit, wherein said static timing analysis analyzes said first path before said second path.

7. The method according to claim 1, wherein said input signal further has an earliest transition, the method further comprising the steps of:

calculating a second value of said time difference between said earliest transition and said active edge;

calculating a second delay between said active edge and said earliest transition appearing in said output signal, wherein said second delay is based on said model responding to said second value;

calculating an second arrival time of said earliest transition in said output signal at said second flip-flop; and storing said second arrival time in said recording medium.

8. The method according to claim 7, wherein (i) said first path is dependent upon both a third path and a fourth path, (ii) said third path determines said latest transition and (iii) said fourth path determines said earliest transition.

9. A method to analyze timing in a circuit, comprising the steps of:

(A) simulating a reception of both an input signal and a clock signal at a first flip-flop, wherein (i) said input signal has an earliest transition, (ii) said input signal arrives through a first path of said circuit and (iii) said clock signal has an active edge;

(B) calculating, using a processor, a value of a time difference between said earliest transition and said active edge;

(C) calculating a delay between said active edge and said earliest transition appearing in an output signal of said first flip-flop, wherein (i) said delay is based on a model responding to said value, (ii) said model characterizes a clock-to-output delay of said first flip-flop as a function of said time difference and (iii) said characterization covering a range of values;

(D) calculating a first arrival time of said earliest transition in said output signal at a second flip-flop, wherein said second flip-flop is connected to said first flip-flop through a second signal path; and (E) storing said first arrival time in a recording medium.

10. The method according to claim 9, wherein said range covers (i) from approximately a short value at which said first flip-flop cannot capture said earliest transition (ii) to a long value at which said clock-to-output delay is approximately a minimum delay through said first flip-flop.

11. The method according to claim 9, further comprising the step of:

conducting a static timing analysis of said circuit, wherein said static timing analysis does not indicate a circuit failure where (i) said value of said time difference fails a hold time of said first flip-flop and (ii) a second arrival time of a latest transition in said output signal meets a setup time of said second flip-flop.

12. The method according to claim 11, wherein said hold time comprises a particular value of said time difference at which said clock-to-output delay is approximately a given percentage longer than a minimum clock-to-output delay of said first flip-flop.

13. The method according to claim 9, further comprising the step of:

conducting a static timing analysis of said circuit, wherein said static timing analysis does not indicate a circuit failure where (i) said value of said earliest transition is too short to be captured by said first flip-flop and (ii) said first arrival time of said earliest transition in said output signal meets a specified arrival time at said second flip-flop.

14. The method according to claim 9, further comprising the step of:

conducting a static timing analysis of said circuit, wherein said static timing analysis analyzes said first path before said second path.

15. A non-transitory storage medium for use in a computer to analyze timing in a circuit, the storage medium recording a computer program that is readable and executable by the computer, when executed the computer program comprising the steps of:

(A) simulating a reception of both an input signal and a clock signal at a first flip-flop, wherein (i) said input signal has a latest transition, (ii) said input signal arrives through a first path of said circuit and (iii) said clock signal has an active edge;

(B) calculating a first value of a time difference between said latest transition and said active edge;

(C) calculating a first delay between said active edge and said latest transition appearing in an output signal of said first flip-flop, wherein (i) said first delay is based on a model responding to said first value, (ii) said model characterizes a clock-to-output delay of said first flip-flop as a function of said time difference and (iii) said characterization covering a range of values;

(D) calculating a first arrival time of said latest transition in said output signal at a second flip-flop, wherein said second flip-flop is connected to said first flip-flop through a second signal path; and (E) storing said first arrival time in a recording medium.

16. The storage medium according to claim 15, wherein said range covers (i) from approximately a short value at which said first flip-flop cannot capture said latest transition (ii) to a long value at which said clock-to-output delay is approximately a minimum delay through said first flip-flop.

17. The storage medium according to claim 15, wherein said computer program further comprises the step of:

conducting a static timing analysis on said circuit, wherein said static timing analysis does not indicate a circuit failure where (i) said first value of said time difference fails a first setup time of said first flip-flop and (ii) said first arrival time of said latest transition in said output signal meets a second setup time of said second flip-flop.

18. The storage medium according to claim 17, wherein said first setup time comprises a particular value of said time difference at which said clock-to-output delay is approximately a given percentage longer than a minimum clock-to-output delay of said first flip-flop.

19. The storage medium according to claim 15, wherein said computer program further comprises the step of:

conducting a static timing analysis on said circuit, wherein said static timing analysis does not indicate a circuit failure where (i) said first value of said latest transition is too short to be captured by said first flip-flop and (ii) said first arrival time of said latest transition in said output signal meets a specified arrival time at said second flip-flop.

20. The storage medium according to claim 15, wherein said input signal further has an earliest transition, the computer program further comprising the steps of:

calculating a second value of said time difference between said earliest transition and said active edge;

calculating a second delay between said active edge and said earliest transition appearing in said output signal, wherein said second delay is based on said model responding to said second value;

calculating an second arrival time of said earliest transition in said output signal at said second flip-flop; and storing said second arrival time in said recording medium.

\* \* \* \* \*